May 26, 1931.  R. W. CANFIELD  1,807,566
MANUFACTURE OF BLOWN GLASSWARE
Filed March 21, 1927   5 Sheets-Sheet 1

Witness:
A. A. Horn

Inventor
R. W. Canfield
by Robson & Brown
Attorney.

May 26, 1931.  R. W. CANFIELD  1,807,566
MANUFACTURE OF BLOWN GLASSWARE
Filed March 21, 1927  5 Sheets-Sheet 5

Witness:
A. A. Horn

Inventor
R. W. Canfield
by Robson D Brown
Attorney.

Patented May 26, 1931

1,807,566

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

MANUFACTURE OF BLOWN GLASSWARE

Application filed March 21, 1927. Serial No. 176,988.

This invention relates to the manufacture of blown glassware, and it has particular relation to the manufacture of electric lamp bulbs, lamp chimneys, tumblers and the like, from glass delivered in a continuous stream from the feeding outlet of an automatic glass feeding device.

The general object of my invention is to provide an improved method and an improved machine for making blown glassware according to the system by which each article is blown in a mold while the glass in the mold is still attached to the parent body of molten glass from which it was derived.

Another object of the present invention is to provide a machine of the above-indicated character in which the various mechanisms are so coordinated and arranged that the glass-fabricating instrumentalities are in almost continuous operation, thus materially decreasing the number of parts employed and simplifying the general construction of the apparatus as a whole.

More specifically, an object of my invention is to provide an improved method and an improved apparatus for forming blown glassware from a ribbon or strip of molten glass that is deposited continuously upon a support and from which the blown articles are formed by means of cooperating blowheads and molds acting upon the glass from opposite sides of the support.

The general system by which a finished article of glassware is fabricated while it is still connected to the molten glass in a supply reservoir is described and claimed in the U. S. Patent of Howard No. 1,592,299 granted July 13, 1926. It greatly simplifies the usual method of making blown glassware by first segragating a mold charge of molten glass, depositing the charge in a mold, and then fabricating the glass.

It has been proposed, prior to my present invention, to carry out this general system by flowing a ribbon or strip of glass upon a continuously advancing horizontal support and by causing portions of the glass ribbon to descend through openings in the support for engagement with blow molds that are supported and advanced beneath the support by means of endless chains, blowheads being provided above the support for cooperation with the blow molds to expand the glass therein. Such a mechanism involves considerable complication and has disadvantages inherent in carrying a large number of molds upon an endless chain conveyor.

My present invention aims to simplify and improve this system of glass manufacture by causing the ribbon or strip of glass to be deposited upon a rotary support having orifices through which the glass to form the articles is caused to descend. The support is carried by a rotary table which also carries a convenient number of blow molds below the level that receives the glass. The table also carries above the level of the glass, blowheads which cooperate with the molds to expand the glass therein. The table rotates continuously and various novel devices are provided for insuring accuracy in operation.

Another object of the invention is to provide a machine of the character described embodying a rotatable support or table upon which is mounted a plurality of fabricating units, each comprising a blank support and a cooperating blowhead and blow mold, each unit being removable as an entirety from the support, without in any way disturbing the operation of the other similar units.

A further object of the invention is to provide an improved device for imparting a preliminary configuration to the glass stream issuing from the outlet of a glass feeder, this device being adapted to overhang the table between the feeding outlet and the glass-supporting elements of the table, and being quickly removable for replacement or repairs. This device may also be adjusted relative to the glass-supporting elements of the shaping machine while the apparatus is in operation, in order to properly align the initially shaped glass with the glass fabricating devices of the shaping machine.

A further object of the invention is to provide simple and efficient means for circulating a cooling medium through the several parts of the machine that come in contact with the glass.

A still further object of the invention is to provide new and improved mechanism for delivering blowing air to the parison in regulable and predetermined quantities, both during the preliminary blowing stages and subsequent to the enclosing of the parison in the blow mold.

A still further object of the invention is to provide new and improved blow-mold mechanism and means for rotating each blow mold about a suspended parison during the time that the latter is being blown to final form in the mold.

A still further object of the invention is to provide cam devices which may be adjusted while the machine is in operation in order to regulate the degree of throw imparted to the mechanisms operated thereby or the time of occurrence thereof.

Other objects will appear from the following specification and the appended claims.

The following operations take place in the fabrication of blown glassware by means of the apparatus to be described below. A continuous stream of molten glass, suitably regulated as to its size, viscosity and rate of flow, is delivered downwardly between preliminary shaping rolls which, by means of pockets formed in one or both of the rolls, shape the stream of glass into a succession of relatively thick and rounded sections, which later form parisons for the articles to be made, connected by relatively thin and flat sections which are ultimately discarded as cullet.

The strip or ribbon of glass, thus preliminarily shaped, is deposited upon a continuously revolving series of apertured plates which I term orifice plates, these plates being arranged side by side around the edge of a rotating table and thus forming a practically continuous support for the strip of glass. The parts are so timed that each of the thick sections of the stream is deposited accurately over one of the orifices in the orifice plates, and it is there allowed to remain for a short time so as to sag down somewhat through the orifice. Then a blow head descends over the orifice plate and delivers a regulated quantity of air through the orifice into the glass. This air, together with the sagging of the glass due to gravity, expands and elongates the parison to an extent preferably controlled by the action of upwardly directed flames over which the parison passes at this time.

When the parison is in proper shape for final blowing, a sectional blow mold rises and closes around the parison, and finish-blowing air is delivered by the blow head through the orifice in the orifice plate, the blow mold being rotated during this operation. When the blowing is completed, the blow head rises, the blow mold opens and descends, the finished article is detached from its parent strip, and the waste glass of the strip is removed as cullet. During these operations the orifice plate has made nearly a complete revolution with the table, and it continues beneath the feed rolls to receive another charge of glass. It will be noted that the glass article is completely fabricated while it is still connected to the original body of molten glass from which it was derived.

*Glass feeding device*

Figures 1, 10, 11:
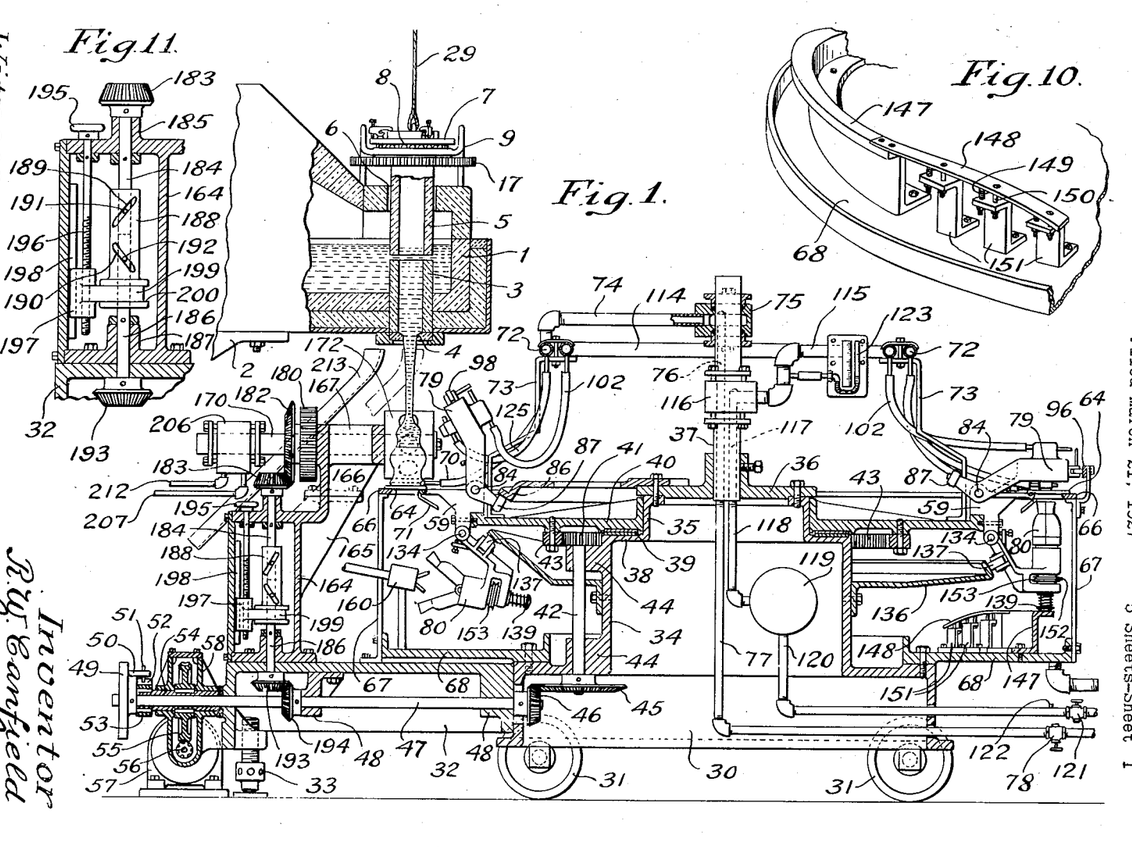
Figure 1 is a vertical longitudinal sectional view through a shaping machine constructed in accordance with the invention, showing its relation to the outlet of a glass feeding device.
Figure 10 is a fragmentary perspective of the adjustable ribbon cam that closes the open sections of the blow mold.
Figure 11 is a detailed view illustrating the mechanism for adjusting the rotation of the preliminary shaping rolls with respect to the rotation of the table of the shaping machine.
Figures 3, 4, 5, 12:
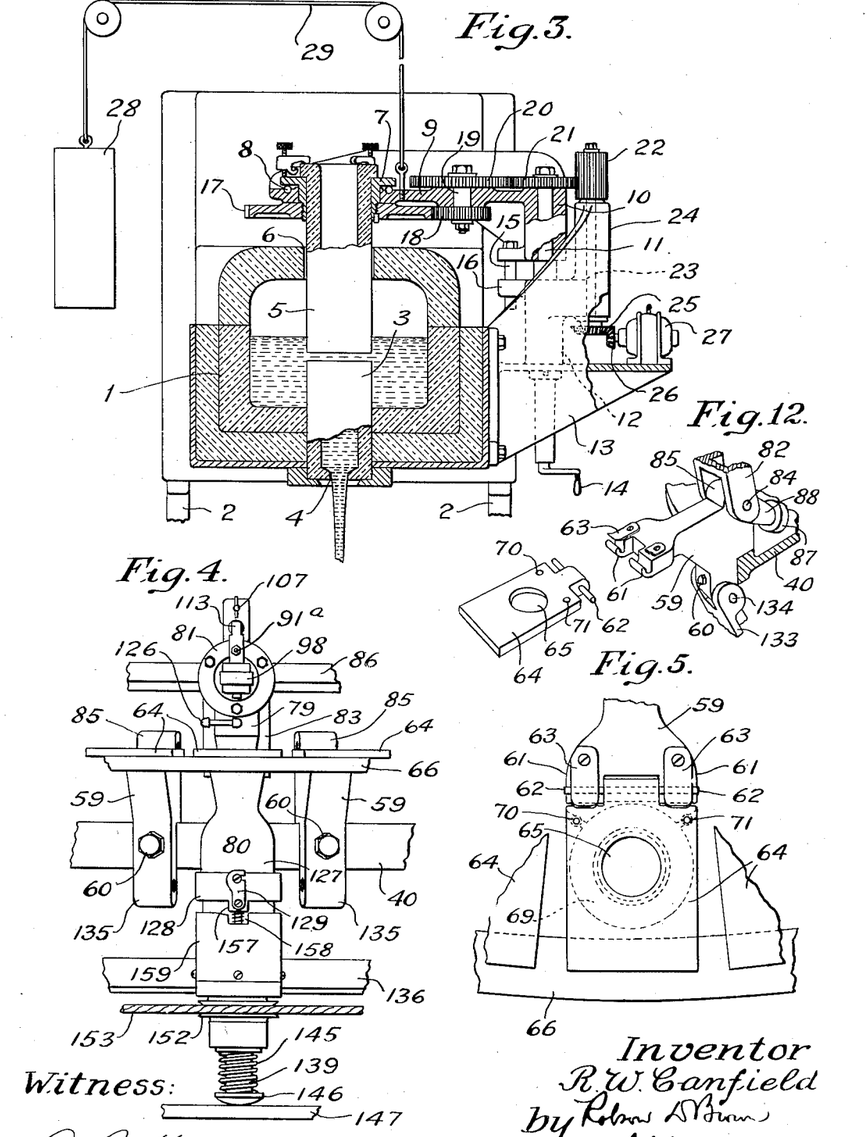
Figure 3 is a transverse vertical sectional view through the forehearth of the associated glass feeding device.
Figure 4 is a detailed elevational view of a blow mold, blow head and orifice plate in cooperative position with respect to one another.
Figure 5 is a fragmentary plan view on an enlarged scale illustrating the construction of the orifice plates.
Figure 12 is a perspective view illustrating one of the brackets that support the sets of orifice plates and cooperating blow heads and blow molds as detachable units.

Referring to Figs. 1 and 3 of the drawings, the present machine is shown as cooperating with a glass feeding device comprising a forehearth 1 which is supported in an overchanging position relative to the shaping machine by a bracket 2. A tubular well 3 is disposed within the forehearth with its upper end slightly below the level of the glass and with its lower end extending through the bottom of the forehearth and terminating in a feeding outlet 4.

The flow of glass through the outlet 4 is regulated by a tubular gate 5 which extends through an opening 6 in the top of the forehearth and in axial alignment with the well 3 and which is provided with a flange collar 7 at its upper end for rotatable engagement with ball bearings 8 carried by a vertically adjustable arm 9. This arm overhangs the forehearth and is provided with a bearing 10 which is freely mounted on the reduced upper end of a vertical shaft 11. This shaft is threaded into a bearing 12 carried by a bracket 13 which is secured to the side of the forehearth. The shaft 11 may be adjusted vertically by means of a handle 14 in order to raise and lower the gate 5, thereby controlling the flow of glass from the forehearth into the well 3. The arm 9 is prevented from swinging laterally on the shaft 11 by a pin 15 which is carried by the bearing 10 for slidable engagement with a bore provided in a lug 16 formed on the threaded bearing 12.

In order that the glass flowing from the forehearth into the well 3 shall be of homogeneous consistency and of uniform temperature throughout, the gate 5 is also rotated constantly at the proper speed during the operation of the feeder. This rotation of the gate 6 is effected through the medium of the following train of reduction gearing. A gear 17 is keyed to the collar 7, and is driven by a pinion 18 fixed to a shaft 19 which is journaled in the arm 9 and which is driven by a gear 20. The gear 20 is, in turn, driven by a gear 21 which is rotatably mounted on the shaft 11 and which slidably meshes with an elongated pinion 22. This pinion is keyed to the upper end of a vertical shaft 23 which is mounted in a bearing 24 carried by the bracket 13 and is provided at its lower end with a bevel gear 25 meshing with a bevel pinion 26 on the shaft of an electric motor 27 which is also mounted on the bracket 13. The weight of the overhanging arm 9, the gate 5 and their associated parts, is counterbalanced by a weight 28 which is connected to the arm 9 by a cable 29.

*Shaping machine frame and drive*

The shaping machine comprises a main base 30 which is mounted on wheels or rollers 31 and an auxiliary base 32 which is fixed at one end to the main base 30 and which is supported at its outer end by a jack screw 33. The base 30 is formed with a centrally disposed cylindrical pedestal or column 34, the upper portion of which is, in turn, formed with a centrally disposed cylindrical extension 35 of smaller diameter, which carries a support 36 for a central column 37, hereinafter to be described. The difference in diameter between the pedestal 34 and the extension 35 forms a horizontal shoulder 38 which constitutes a support for two coacting bearing rings 39 upon which a mold table 40 is rotatably mounted.

In order to carry the glass fabricating instrumentalities successively adjacent to the outlet 4 of the glass feeder, the table 40 is rotated by means of a pinion 41 which is fixed to the upper end of a vertical shaft 42 for intermeshing engagement with an internal ring gear 43 which is fixed to the underside of the table 40. The shaft 42 is journaled in bearings 44 formed on the column 34 and is provided at its lower end with a bevel gear 45 meshing with a bevel pinion 46 which is fixed to the inner end of a drive shaft 47. This shaft is mounted in bearings 48 carried by the auxiliary base 32 and has a disc 49 fixed thereto at its outer end. This disc is formed with a lug 50 which carries a shear pin 51 for driving engagement with a shoulder 52 formed on a collar 53. This collar is keyed to a sleeve 54 which is rotatably mounted on the drive shaft 47 and has a worm gear 55 keyed thereto for intermeshing engagement with a worm 56 coupled to the shaft of an electric motor 57. The worm gear 55 and the worm 56 are enclosed by a housing 58 which is fixed to the base 32 and through which the sleeve 54 loosely extends. If, during the operation of the machine, an abnormal strain is encountered the shear pin 51 will break, thus permitting the motor 57 to continue to rotate the worm gear 55, sleeve 54 and collar 53 without transmitting any motion to the shaft 47 and to the mechanism driven thereby.

*Orifice plate structure*

A plurality of radially extending brackets 59, in the present instance sixty in number, are detachably secured to the periphery of the table 40 by means of screws 60 (Fig. 8) and each bracket is provided at its outer end with a pair of spaced bearings 61 of hook or U-shape which as shown in Fig. 5 pivotally support a hinge pin 62 which is removably retained in the bearings 61 by means of overhanging leaf springs 63. A plate 64 provided with an orifice 65 is mounted for vertical swinging movement on each hinge pin 62. The plates 64 are maintained in a horizontal position during the glass fabricating operations, presently to be described, by means of an annular track 66 upon which the outer edges of the plates are slidably supported. The track 66 is supported at intervals by vertical uprights 67 which are secured at their lower ends to an annular trough or water drainage pan 68 which is mounted on the base 30 of the machine.

The machine is so arranged with respect to the glass feeding device that a circle passing through the centers of the orifices 65 in the plates 64 intersects the vertical axis of the outlet 4 of the glass feeding device. The plates 64 together constitute, in effect, a continuous support for the ribbon of glass as it is fed downwardly thereto, as will be hereinafter set forth.

Each of the orifice plates 64 is cooled by water which is admitted to an annular passageway 69 (Fig. 8) formed therein concentric with the orifice 65, from a flexible water supply pipe 70 and which, after circulating through the plate, escapes through an outlet pipe 71. The supply pipe 70 communicates with an annular pipe 72 (Figs. 1 and 2) which is supported above the table 40 and concentric to the column 37, by brackets 73 carried by the table 40. This pipe communicates with a pipe 74 which, in turn, communicates with a stuffing box 75 that is rotatably mounted on the central column 37. This stuffing box communicates with a passageway 76 which extends longitudinally through the column 37 and communicates at its lower end with a pipe 77 connected to a source of water supply and provided with a flow controlling valve 78.

A blow head 79 and a blow mold 80 are pivotally mounted on each of the brackets 59 above and below each of the orifice plates 64 carried thereby and form, with the bracket and the orifice plate, a complete and quickly detachable unit.

*Blow head structure*

Figure 8:
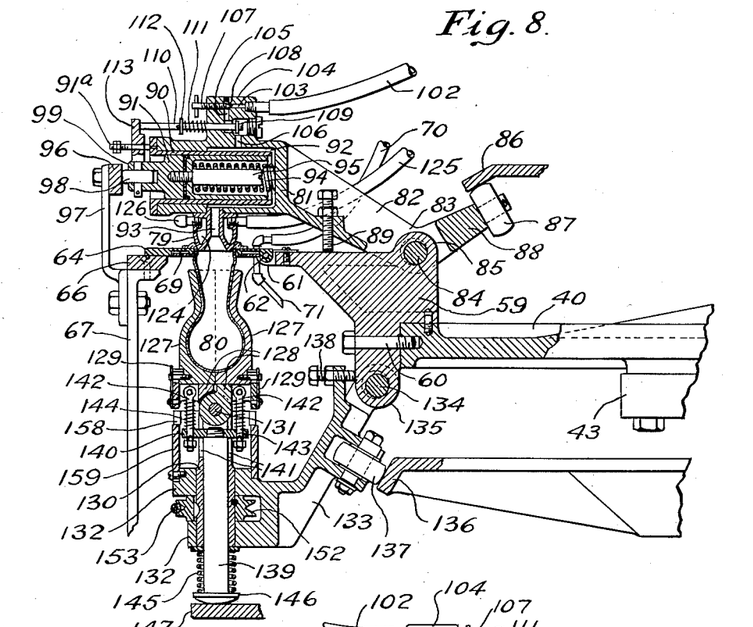
Figure 8 is a fragmentary vertical sectional view through an orifice plate and its cooperating blow head and blow mold, illustrating the manner in which these elements may be detachably mounted on the table as a separate and independent unit.

As shown in Fig. 8, each blow head 79 is carried by a fluid pressure cylinder 81 which is formed on an arm 82 of a bell crank lever 83. This lever is pivotally mounted for vertical swinging movement upon an eccentric stud 84 which is mounted for rotary adjustment in a bearing 85 provided on the bracket 59. The blow head is raised and lowered at the proper times into and out of operative relation with its associated orifice plate 65, by a segmental cam 86 which is carried by the support 36 and is engaged by a roller 87 provided on the other arm 88 of the bell crank lever 83. A stop screw 89 is threaded into the arm 82 of the lever 83 for engagement with the bracket 59 and may be adjusted to limit the downward movement of the blow head 79.

The cylinder 81 is provided with a cylindrical lining 90 within which a piston 91, of shell like structure, is slidably mounted. The inner portion of the cylinder 81 is provided with an annular channel which forms a passageway 92 surrounding the inner portion of the lining 90 and communicating with the blow head 79 through a port 93 (Fig. 8). The piston 91 is urged outwardly by a coil spring 94 which is interposed between the piston and the end wall of the cylinder 81 and which encircles a pin 95 carried by the piston. The piston 91 is forced inwardly at the proper time in order to deliver a predetermined volume of air to the parison through the passageway 92 and port 93 in the blow head during the preliminary shaping operations, by means of a flexible ribbon cam 96 which is supported at intervals by brackets 97 carried by the uprights 67 and which is engaged by a roller 98 provided on an extension 99 formed on the piston 91. This cam may be flexed by means of adjusting screws 100 and lock screws 101 which are threaded into the brackets 97 (Fig. 2) in order to regulate the inward throw imparted to the piston 91 and the time of occurrence and the rate of such movement. The piston 91 is prevented from becoming displaced from the cylinder by an adjustable stop 91a carried by the cylinder and which extends loosely through an aperture provided in a stud 113 provided on the extension 99 of the piston.

Finish blowing air is admitted to the blow head 79 at the proper time from a flexible pipe 102 which communicates with a passageway 103 provided in a valve casing 104 formed on the upper side of the cylinder 81. This passageway communicates with a passageway 105 which, in turn, communicates with a passageway 106 communicating with the annular passageway 92 in the cylinder 81. The rate of flow of finish blowing air is regulated as desired by a needle valve 107 which is threaded into the valve casing 104 and cooperates with a seat 108 provided adjacent to the inner end of the passageway 103.

The supply of finish blowing air to the blow head 79 is controlled by a valve 109 which interrupts communication between the passageways 105 and 106. This valve is carried by a stem 110 which extends through the casing 104 and is urged towards a closed position by a spring 111 interposed between the casing 104 and a collar 112 carried by the stem 110. The valve 109 is opened at the proper time in order to establish communication between the source of finish blowing air and the blow head 79 by means of the pin 113 which is moved into engagement with the outer end of the valve stem 110 by a continued inward movement of the piston 91 subsequent to the delivery thereby of the initial increment of air to the parison.

The flexible pipe 102 which delivers finish-blowing air to the blow head 79 communicates with an annular pipe 114 (Figs. 1 and 2) which is also supported above the table 40 by the brackets 73 that carry the water pipe 72. The pipe 114 communicates with a pipe 115 which, in turn, communicates with a stuffing box 116 rotatably mounted on the central column 37. This stuffing box communicates with a passageway 117 extending vertically through the column 37 and communicates at its lower end with a pipe 118 leading to a low-pressure air tank 119. This tank communicates with a source of air under pressure through a pipe 120 provided with a needle valve 121 for controlling the rate of flow of air therethrough. A leak port 122 is also provided in the pipe 120 in order to reduce the air pressure in the system to the desired degree and to also counteract the effect of any leaks that may exist or that may develop in the several connections described. The valve 121 is adjusted so that a sufficient air pressure is maintained throughout the system notwithstanding the amount of air escaping through the leak port 122, which amount is at all times in excess of the amount of air that may escape through any leaks in the system. The flow of air to the blow head is therefore maintained steady and at a uniform pressure. The pressure of air in the system is indicated by means of a gauge 123 which communicates with the pipe 115.

The blow head 79 is cooled by water admitted to an annular passage 124 formed therein from a flexible inlet pipe 125 communicating with the annular water pipe 72. The cooling water, after circulating through the blow head escapes through an outlet pipe 126.

Blow mold structure

Each blow mold 80 comprises two halves or sections 127 which are detachably secured to mold holders 128 by means of hooks or clips 129. The holders 128 are pivotally mounted upon the upper end of a vertical spindle or sleeve 130, as at 131, for swinging movement about a horizontal axis. This sleeve is rotatably mounted in upper and lower bearings 132 formed on an arm 133 which is pivotally mounted upon an eccentric stud 134 that is also mounted for rotatable adjustment in a bearing 135 formed on the bracket 59. The mold is raised and lowered into and out of operative relation with its associated orifice plate 64 by means of a cam 136 which is carried by the central pedestal 34 and is engaged by a roller 137 on the arm 133 intermediate of its ends. A stop screw 138 is threaded into the arm 133 for engagement with the bracket 59 and may be adjusted to limit the upward movement of the blow mold 80.

The sections 127 of the blow mold are opened and closed at the proper times to inclose a parison and to release a finished blown article, by means of a rod 139 which extends coaxially through the sleeve 130 and which carries at its upper end a cross head 140 extending through slots 141 provided in the sleeve 130. A pair of rods 142 disposed one on each side of the sleeve 130, are pivotally connected to the mold holders 128 and extend loosely through apertures 143 provided in the cross head 140. Compression springs 144 encircle the rods 142 between the mold holders 128 and the cross head 140 and tend to maintain the sections 127 of the blow mold in a closed position when the rod 139 is raised. A compression spring 145 encircles the rod 139 between the lower bearing 132 and a head 146 provided on the lower end of the rod 139. This spring tends to maintain the rod 139 in the retracted position of Fig. 9 thus holding the sections 127 of the blow mold open when the blow mold is not in use.

The sections 127 of the blow mold are closed about a parison at the proper time after they have been elevated toward the orifice plate 64, by a cam 147 which is engaged by the head 146 of the rod 139 during the rotation of the mold table. This cam raises the rod 139 against the action of the spring 145 and swings the mold holders 128 and the mold sections 127 inwardly by motion transmitted thereto through the springs 142 which yieldably maintain the sections of the blow mold in a closed position during the finish blowing operation.

The cam 147 is provided with a flexible strap 148 adjacent to one or both ends thereof (Fig. 10) and this strap may be flexed as desired by means of screws 149 and lock screws 150 which are threaded into brackets 151 carried by the water drainage pan 68. By flexing this strap, the rapidity with which the sections 127 of the blow mold are closed and opened may be regulated as desired according to existing conditions.

The blow mold 80 is rotated during the finish-blowing operation, by means of a pulley 152 (Fig. 8) which is keyed to the sleeve 130 between the bearings 132. As the mold table 40 is rotated, this pulley is carried into engagement with a cable 153 (Fig. 2) which extends partially around the table and which is maintained in position by the several pulleys 152 of the blow mold 80 by which it is frictionally engaged. This cable is supported at its ends by brackets 154 and 155 respectively and may be tightened by means of a yieldable tightening device 156 carried by the bracket 155.

By reason of the fact that the blow molds are spaced so closely together about the periphery of the table, it is necessary that the sections 127 thereof be opened in a radial direction with respect to the axis of the table, and in order to insure that the molds open in such manner the mold holders 128 are provided with a pair of diametrically disposed tongues 157, one of which is shown in Fig. 4 and which are adapted to engage notches 158 provided in a cylindrical member 159 which is secured to the upper bearing 132. In the event that the cam 147 releases the rod 139 when the mold sections are in a position to open laterally, the tongues will ride upon the upper edge of the member 159 until they register with the notches 158 into which they are adapted to enter, thus permitting the mold holders 128 to swing radially downwardly under the action of the spring 145 to release the blown article.

The blow molds 80 are cooled by water sprayed thereupon from one or more nozzles 160 (Fig. 1) immediately after they have released the blown articles and have been lowered out of operative relation with the orifice plate 64.

Parison reheating means

The parisons of glass suspended from the orifice plate 64 may be heated if desired by a flame directed thereagainst from a plurality of arcuate burners 161 (Figs. 2 and 9) which are supported at intervals by brackets 162 which are mounted for vertical adjustment in slots 163 provided in the uprights 67. The flames from these burners may be regulated according to existing conditions, and are adapted not only to reheat the chilled skin of the suspended parison during the formation stages, but to exert a dynamic force against the parison which tends to counteract the sagging thereof under the influence of gravity and, in a certain degree, to regulate the configuration imparted to the glass by the internal blowing pressure. The amount of heat and the pressure exerted by the flame may be independently regulated in each burner so as to effectively reheat the chilled skin of the parison and to control the rate of sagging during the time that the parison is suspended in contact with the outer atmosphere.

Preliminary parison shaping mechanism

Figure 2:
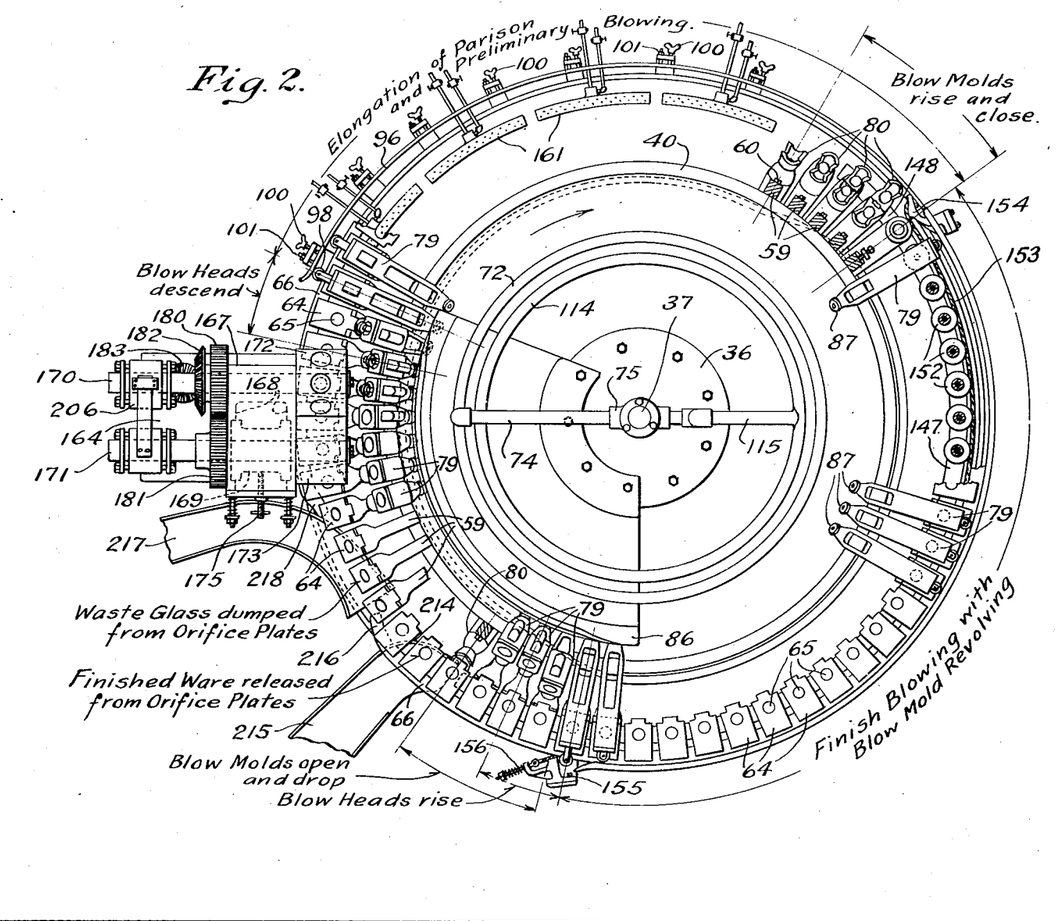
Figure 2 is a plan view of the structure shown in Fig. 1, certain parts, which are identical in many positions, being omitted for the purpose of clearness.
Figures 6, 7:
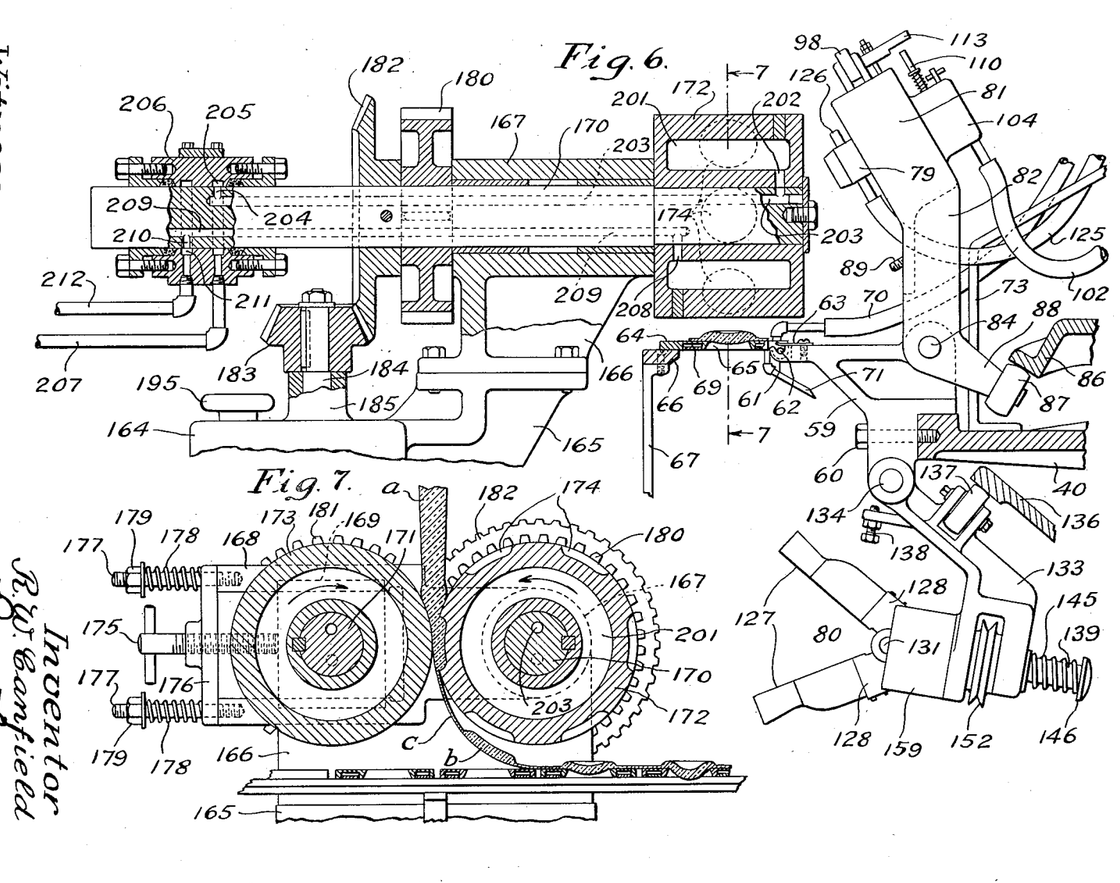
Figure 6 is an enlarged view, partly in side elevation and partly in vertical longitudinal section illustrating more in detail the construction of the preliminary shaping rolls and their relation to the glass fabricating devices of the shaping machine.
Figure 7 is a vertical transverse sectional view taken on line 7—7 of Figure 6.

In order to facilitate the formation of the parison, the following described mechanism is provided for imparting a preliminary configuration to the glass as it is delivered in a stream from the outlet of the feeder and prior to its deposit upon the orifice plates 64 of the shaping machine. Referring to Figs. 1, 2 and 7, a housing 164 is mounted on the auxiliary base 32 and is provided with an upwardly and forwardly extending bracket 165 upon the upper end of which a bracket 166 is detachably secured. The bracket 166 is formed with a fixed bearing 167 and with a guideway 168 within which a slide bearing 169 is adjustably mounted. Horizontal shafts 170 and 171 are rotatably mounted in the bearings 167 and 169, respectively, and have rolls 172 and 173 keyed thereto at their forward ends. The periphery of the roll 172 is provided with a series of circular pockets or depressions 174, but the roll 173 preferably has a smooth unbroken peripheral surface.

The line of tangency of the rolls 172 and 173 is disposed directly beneath the outlet 4 of the feeding device and intersects a prolongation of the axis thereof, which axis also lies in a vertical plane passing through the centers of the pockets 174. It will thus be apparent that, as the rolls 172 and 173 rotate towards each other, the roll 173 will force quantities of glass into the pockets 174 in the roll 172 and cause it to assume the configuration thereof, leaving a thin strip of glass connecting each of the partially shaped parisons (Fig. 7).

This general method of shaping a stream of glass by means of forming rolls provided with shaping pockets or recesses is described and claimed in the U. S. Patent to Soubier, No. 1,453,290 granted May 1, 1923.

As soon as a partially formed parison passes from between the rolls, it sags out of engagement with its pocket and is carried by the rotation of the table to a position over an orifice 65 in one of the orifice plates 64, in position for the subsequent shaping operations.

The roll 173 may be adjusted towards and from the roll 172 to meet with existing conditions by means of a screw 175 which is threaded into a plate 176 which closes the side of the guideway 168. This plate is slidably mounted on studs 177 which are threaded into the guideway 168 and is yieldably maintained in position by springs 178 which encircle the studs 177. The tension exerted by the springs 178 may be adjusted by nuts 179 which are threaded upon the studs 177. In the event that an unyielding substance, such as a stone or a lump of "frozen" glass, should be fed between the rolls, the roll 173 may be forced away from the roll 172 against action of the springs 178, thus permitting the passage of such substance without injury to the rolls.

The rolls 172 and 173 are caused to rotate towards each other at the same peripheral speed by means of intermeshing gears 180 and 181 keyed to the shafts 170 and 171, respectively, and are driven by means of a bevel gear 182 (Fig. 1) which is keyed to the shaft 170 and meshes with a bevel pinion 183. This pinion is keyed to the upper end of a vertical shaft 184 which is mounted in a bearing 185 formed on the upper portion of the housing 164. The shaft 184 is disposed in axial alignment with a shaft 186 which is mounted in a bearing 187 formed on the lower portion of the housing 164 and the shafts 184 and 186 are adjustably connected by means of a sleeve 188. This sleeve is provided with two slots 189 and 190 which are inclined in opposite directions with respect to each other and which are respectively engaged by pins 191 and 192 carried by the shafts 184 and 186. The lower end of the shaft 186 is provided with a bevel pinion 193 which meshes with a bevel pinion 194 keyed to the drive shaft 47. It will thus be seen that, as the shaft 47 rotates in driving the table 40 of the shaping machine and the parts carried thereby, it will also cause the rotation of the rolls 172 and 173.

The rotation of the rolls 172 and 173 may be adjusted with respect to the rotation of the table, in order to deposit the partially formed parisons accurately over the apertures 65 in the plates 64 and during the operation of the machine, by means of a hand wheel 195 which is fixed to a vertical screw 196 disposed within the housing 164. The lower end of this screw is threaded into a vertically adjustable bearing 197 which is slidably mounted in a guideway 198 provided on the wall of the housing 164 and which is provided with a forked end 199 for engagement with a grooved portion 200 of the sleeve 188. By rotating the hand wheel 195, the sleeve 188 may be raised or lowered, thus causing relative rotation between the driving shaft 186 and the driven shaft 184 through the medium of the inclined slots 189 and 190 and their coacting pins 191 and 192.

The rolls 172 and 173 are of hollow construction to provide an annular passage 201 (Fig. 6) for the circulation of a cooling medium, such as water or steam, which is admitted through a port 202 that communicates with a duct 203 extending longitudinally through the shaft 170. This duct, in turn, communicates through a port 204 with an annular passageway 205 formed in a stuffing box 206 which communicates with a water inlet pipe 207. The water, after circulating through the passage 201, escapes through a port 208 to a duct 209 extending longitudinally through the shaft 170 and thence through a port 210 to an annular groove 211, also formed in the stuffing box 206, and thence to an escape pipe 212. While this cooling system has been described in connection with the roll 172, it will be understood that a similar system is also provided for the roll 173.

The delivery of glass to the machine may be interrupted when desired by means of a trough 213 which may be moved to the position in Fig. 1 indicated in dotted lines in which it will intercept the glass as it issues from the outlet of the feeder and deflect it to a cullet pit in the usual manner.

*Operation*

The operation of the machine is as follows:

The gate 5 in the feeding device is adjusted so as to regulate the stream of glass *a* flowing through the outlet 4 according to the size of the parisons to be produced and the speed of the shaping machine. The stream of glass falls directly between the rolls 172 and 173 and is forced by the roll 173 into the pockets 174 of the roll 172 forming a series of partially formed parisons *b* connected by a thin strip of glass *c* as shown in Figure 7. The continued rotation of the rolls 172 and 173 carries the string of parisons in a downward direction and the action of gravity causes the parisons *b* to become disengaged from the depressions 174 and to gravitate downwardly upon the orifice plates 64 to positions directly over the orifices 65 formed therein. The rotation of the rolls 172 and 173 relative to the rotation of the table of the shaping machine may be adjusted by means of the hand screw 195 so as to insure that the parisons *b* are deposited accurately over the orifices 65. For a short period of time during the rotation of the mold table the parisons *b* are allowed to sag through the orifices 65 as shown in Fig. 7, but are prevented from becoming displaced therefrom by the connecting strip of glass *c*.

Figure 9:
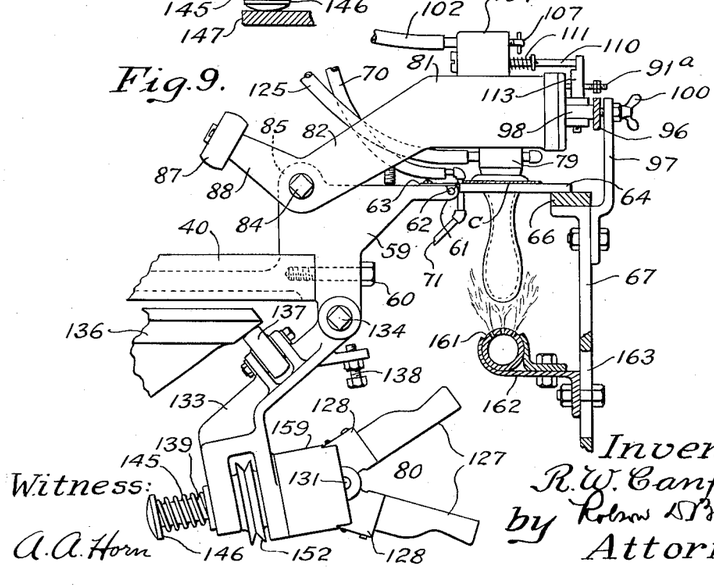
Figure 9 is a fragmentary side elevational view illustrating the manner in which the parison is supported and reheated during the preliminary blowing stages and prior to its enclosure in the blow mold.

As soon as a parison has sagged sufficiently to provide a concave depression in its upper surface such as will function as an initial blow-opening, the roller 87 which supports the blow head 79 in a raised position encounters a low portion in the cam 86 which permits the blow head and its associated mechanism to descend into operative position relative to the orifice plate and parison as shown in Fig. 8. By this time the rotation of the table has carried the roller 98 of the initial blow mechanism into proximity to the cam 96 which gradually forces the piston 91 inwardly against the action of the spring 94, thus slowly forcing a predetermined volume of air into the parison through the passageway 93 provided in the blow head 79. The delivery of this initial quantity of air to the parison continues for substantially one-third of the rotation of the mold table and imparts a bulbous shape to the parison, as illustrated in Fig. 9. During this stage in the formation of the parison, it is carried over the burners 161 which are adapted to reheat the chilled skin of the parison and to retard the elongation of the parison under the action of gravity so as to increase the lateral distention of the parison. By the time that the parison has passed over the last of the burners 161, it has assumed a configuration adapted to be enclosed within the blow mold.

At this point in the rotation of the table the blow mold 80 is swung upwardly by the roller 137 encountering a high portion in the cam 136 and is closed about the suspended parison by the upward movement of the rod 139 caused by the head 146 thereof encountering a high portion in the cam 147. By this time the inward movement of the blow head piston 91 caused by the cam 96 has carried the pin 113 into engagement with the end of the valve stem 110 with the result that further inward movement of the piston opens the valve 109 and establishes communication between the source of blowing air and the blow head 79. The steady flow of air thus admitted through the blow head expands the parison to final form in the blow mold, as illustrated in Fig. 8.

Immediately after the sections 127 of the blow mold have been closed about the parison and before the application of finish blowing air, the pulley 152 is carried into frictional engagement with the cable 153 which causes the blow mold to rotate. This rotation of the blow mold continues throughout the finish-blowing operation, which occurs throughout substantially one-third of the rotation of the table. At this stage in the fabrication of the article, the roller 87 encounters a high portion in the cam 86 which swings the blow head upwardly and out of operative engagement with the parison. The cam 96 curves upwardly at this point so as to maintain the piston 91 in its inner position until contact is broken between the blow head 79 and the parison. As soon as the blow head is raised sufficiently, the roller 98 leaves the cam 96, permitting the piston 91 to move outwardly under the action of the spring 94 and thereby drawing a fresh increment of air into the cylinder for the next succeeding blowing operation. Simultaneously with the elevation of the blow head 79, the head 146 on the rod 139 moves out of contact with the cam 147, thus permitting the sections 127 of the blow mold to swing outwardly under the action of the spring 145, and out of engagement with the parison. The roller 137 next encounters a low portion in the cam 136 which permits the sections of the blow mold to be lowered to the position shown in Figs. 6 and 7. The continued rotation of the table carries the bare article suspended by its neck from the orifice 65 of the plate 64 to a position in which it will engage a curved side 214 of a chute 215 (Fig. 2) which will deflect it laterally and break its connection with the ribbon of glass supported by the plates 64, permitting it to slide down the chute to a delivery station. As soon as the plates 64 pass the chute 215 they encounter a downwardly inclined portion 216 of the track 66 which permits them to swing downwardly under the action of gravity and out of contact with the strip of cullet glass from which the blown articles were removed. This strip of glass bends downwardly and enters a cullet chute 217 which deflects the waste glass from the machine and directs it to a suitable cullet pit. As soon as the glass has been removed from the plates 64, the plates encounter an upwardly inclined portion 218 of the track 66 which elevates them again to a horizontal position whereupon they are again passed beneath the rollers 172 and 173 and the above described cycle of operations is repeated.

The illustrated embodiment of the invention may be modified in construction and mode of operation without departing from the scope of the invention as defined in the appended claims.

I claim as my invention:

1. Apparatus for making blown glassware comprising a continuously rotatable support for a strip or ribbon of molten glass, said support having a plurality of downwardly opening orifices for the issue of glass from said strip, a plurality of blow molds rotatable with said support and each adapted to close beneath one of said orifices for enclosing glass issuing from said orifice, and means for blowing air through said orifice into the interior of the glass while the glass is enclosed in said mold.

2. Apparatus for making blown glassware comprising a continuously rotatable support, means for depositing on said support a continuous strip or ribbon of molten glass, said support having a plurality of orifices for the downward delivery of portions of said glass, a plurality of blow molds rotatable with said support, and each adapted to close beneath one of said orifices, and means for directing fluid under pressure through said orifices into said glass while the glass is enclosed in the said molds.

3. In the manufacture of blown glassware by the use of a receptacle for molten glass, a mold, and means for blowing glass derived from said receptacle in said mold while the glass is still attached to the parent body of glass contained within the receptacle, the combination of continuously rotatable supporting means for receiving the glass discharged from said receptacle, said supporting means being provided with spaced openings, means for expanding glass downwardly through said openings, and molds rotatable with said supporting means and each arranged to close below one of said openings.

4. In the manufacture of blown glassware by the use of a receptacle for molten glass, a mold, and means for blowing glass derived from said receptacle in said mold while the glass is still attached to the parent body of glass contained within the receptacle, the combination of continuously rotatable supporting means for receiving the glass discharged from said receptacle, said supporting means being provided with spaced openings, means for expanding glass downwardly through said openings, molds rotatable with said supporting means and each arranged to close around a parison of glass below one of said openings, and means for producing relative rotation between each mold and the glass contained therein.

5. In the manufacture of blown glassware by the method that comprises causing molten glass to move downwardly through an orifice and blowing the glass in a blow mold by fluid pressure applied through said orifice, the combination of continuously rotatable supporting means having spaced orifices, means for depositing a continuous ribbon or strip of glass upon the said supporting means and over said orifices, means for projecting blowing air through said orifices, and blow molds rotatable with said table and each arranged to close below one of said orifices to receive and shape the glass descending through said orifice.

6. In the manufacture of blown glassware, the method that comprises depositing molten glass upon a continuously rotatable support, causing portions of the deposited glass to descend in suspended masses through orifices in said support, directing fluid under pressure through said orifices into the interior of the said masses of glass, receiving the said masses of glass in molds and expanding said glass in said molds by fluid pressure applied through said orifice.

7. The method of making blown glassware which comprises depositing a continuous strip or ribbon of molten glass upon a continuously rotating support and above openings formed in said support, causing portions of said glass to descend through the said openings, then lowering a blowhead to operative position adjacent to one of said openings, receiving the issued glass in a mold beneath said opening and then blowing air through said blowhead to expand the glass in said mold while the glass is still connected to the glass above the said opening.

8. Apparatus for shaping hollow glassware comprising a plurality of supports each having an orifice provided therein, means for feeding a ribbon of glass upon said supports and in a suspended position over a plurality of said orifices, and a blow head and an associated blow mold mounted for cooperation and movement with each of said supports.

9. Apparatus for shaping hollow glassware comprising a movable carrier, a plurality of supports mounted on said carrier and each having an orifice provided therein, means for feeding a ribbon of glass upon said supports and in a position bridging a plurality of said orifices, and a blow head and an associated blow mold mounted on said carrier for cooperation with each of said supports.

10. Apparatus for shaping hollow glassware comprising a rotatable carrier, a plurality of supports mounted on said carrier and each having an orifice provided therein, means for feeding a ribbon of glass upon said supports and in a position covering a plurality of said orifices, and a blow head and an associated blow mold mounted on said carrier for cooperation with each of said supports.

11. Apparatus for shaping hollow glassware comprising a carrier mounted for rotation about a vertical axis, a plurality of plates pivotally mounted on said carrier and each having an orifice provided therein, means for feeding a ribbon of glass upon said plates and in a position extending over a plurality of said orifices, and a blow head and an associated blow mold mounted on said carrier for cooperation with each of said supports.

12. Apparatus for shaping hollow glassware comprising a carrier mounted for rotation about a vertical axis, a plurality of brackets detachably mounted on said carrier, a parison support pivotally mounted on each of said brackets and each having an orifice provided therein, means for feeding a stream of glass upon said supports and in a position extending over a plurality of said orifices, and a blow head and an associated blow mold pivotally mounted on each of said brackets for cooperation with the support carried thereby and forming therewith an independent and quickly detachable glass fabricating unit.

13. Apparatus for shaping hollow glassware comprising a carrier mounted for rotation about a vertical axis, a plurality of brackets detachably mounted on said carrier, a parison support pivotally mounted on each of said brackets and each having an orifice provided therein, means for feeding a stream of glass upon said supports and in a position extending over a plurality of said orifices, and a blowhead and an associated blow mold pivotally mounted on each of said brackets for cooperation with the support carried thereby and forming therewith an independent and quickly detachable glass fabricating unit, and means for independently supplying blowing air to each of said blow heads.

14. Apparatus for shaping hollow glassware comprising a movable carrier, a plurality of glass fabricating units removably mounted on said carrier, each unit including a parison support having an orifice provided therein, a blow head and an associated blow mold, and means for feeding a ribbon of glass upon said supports and in a position extending over a plurality of said orifices.

15. Apparatus for shaping hollow glassware comprising a rotatable carrier, a plurality of plates pivotally mounted thereon and each having an orifice provided therein, means for feeding a ribbon of glass upon said plates and in a position extending over a plurality of said orifices, a blow head and an associated blow mold mounted on said carrier for cooperation with each of said plates, means for moving said blow head and blow mold into and out of operative relation relative to said plates, means for applying blowing pressure through said blow head, and means for rotating said blow mold about its axis during the application of said blowing pressure.

16. Apparatus for shaping hollow glassware comprising a carrier mounted for rotation about a vertical axis, a plurality of plates pivotally mounted on said carrier and each having an orifice and a passageway for a cooling medium, means for feeding a ribbon of glass upon said plates and over said orifices, a blow head and an associated blow mold mounted on said carrier for cooperation with each of said plates, and means for circulating a cooling medium through the passageways in said plates.

17. Apparatus for shaping hollow glassware comprising a carrier mounted for rotation about a vertical axis, a plurality of plates mounted on said carrier and each having an orifice provided therein, means for feeding a ribbon of glass upon said plates and over said orifices, a blow head and an associated blow mold mounted on said carrier for cooperation with each of said plates, each of said blow heads having a passageway provided therein, and means for circulating a cooling medium through the passageways in said blow heads.

18. Apparatus for shaping hollow glassware comprising a table mounted for rotation about a vertical axis, a plurality of brackets mounted adjacent to the periphery of said table, a plate pivotally mounted on each of said brackets for vertical swinging movement and each having an orifice provided therein, a track upon which said plates are slidably mounted in a horizontal position, means for feeding a ribbon of glass upon said plates and over the orifices provided therein, a blow head and an associated blow mold pivotally mounted on each of said brackets for cooperation with the plate carried thereby, and means for moving said blow head and said blow mold into and out of operative position relative to said plate.

19. In combination with a glass feeding device having a feeding outlet, a glass-shaping machine comprising a carrier mounted for rotation about a vertical axis, a plurality of supports mounted on said carrier for movement beneath the outlet of said feeding device, a blow head and an associated blow mold mounted on said carrier for cooperation with each of said supports, and means for imparting a preliminary configuration to the glass subsequent to its issuance from said outlet and for delivering it in a stream to said supports.

20. In combination with a glass feeding device having a feeding outlet, a glass-shaping machine comprising a carrier mounted for rotation about a vertical axis, a plurality of supports mounted on said carrier for movement beneath the outlet of said feeding device, a blow head and an associated blow mold mounted on said carrier for cooperation with each of said supports, and a plurality of rolls for imparting a preliminary configuration to the glass subsequent to its issuance from said outlet and for delivering it in a stream to said supports.

21. In combination with a glass feeding device having an outlet, a glass shaping machine comprising a carrier mounted for rotation about a vertical axis, a plurality of supports, each having an orifice provided therein, mounted adjacent to the periphery of said carrier for movement beneath said outlet, a blow head and an associated blow mold mounted on said carrier for cooperation with each of said supports, a pair of coacting rolls disposed beneath said outlet and in an overhanging position relative to said supports, one of said rolls having a plurality of depressions provided therein and adapted to impart a preliminary configuration to the glass subsequent to its issuance from said outlet and for delivering it in a stream to said supports, means for rotating said carrier and said rolls in timed relation with respect to each other, and means for adjusting the rotation of said rolls relative to the rotation of said carrier to accurately deposit the partially formed glass over the orifices in said supports.

22. In combination with a glass feeding device having an outlet, a glass shaping machine comprising a carrier mounted for rotation about a vertical axis, a plurality of supports, each having an orifice provided therein, mounted adjacent to the periphery of said carrier for movement beneath said outlet, a blow head and an associated blow mold mounted on said carrier for cooperation with each of said supports, a pair of coacting rolls disposed beneath said outlet and in an overhanging position relative to said supports, one of said rolls having a plurality of depressions provided therein and adapted to impart a preliminary configuration to the glass subsequent to its issuance from said outlet and for delivering it in a stream to said supports, means for rotating said carrier and said rolls in timed relation with respect to each other, and means for adjusting the rotation of said rolls relative to the rotation of said carrier while the machine is in operation to accurately deposit the partially formed glass over the orifices in said supports.

23. In combination with a glass feeding device having an outlet, a glass shaping machine comprising a carrier mounted for rotation about a vertical axis, a plurality of supports, each having an orifice provided therein, mounted adjacent to the periphery of said carrier for movement beneath said outlet, a blow head and an associated blow mold mounted on said carrier for cooperation with each of said supports, a pair of coacting rolls disposed beneath said outlet and in an overhanging position relative to said supports, one of said rolls having a plurality of depressions provided therein and adapted to impart a preliminary configuration to the glass subsequent to its issuance from said outlet and for delivering it in a stream to said supports, means for rotating said carrier and said rolls in timed relation with respect to each other, and means for yieldably maintaining said rolls in operative relation with respect to each other.

24. In combination, a glass feeding device having an outlet, a glass shaping machine comprising a carrier mounted for rotation around a vertical axis, a plurality of supports, each having an orifice provided therein, mounted on said support for movement beneath said outlet, a blow head and an associated blow mold mounted on said carriers for cooperation with each of said supports, a pair of coacting rolls disposed beneath said outlet and in an overhanging position relative to said supports for imparting a preliminary configuration to the glass subsequent to its issuance from said outlet and for delivering it in a stream to said supports, and means for circulating a cooling medium through said rolls.

25. In combination, a glass feeding device having an outlet, a glass shaping machine comprising a carrier mounted for rotation around a vertical axis, a plurality of supports, each having an orifice provided therein, mounted on said carrier for movement beneath said outlet, a blow head and an associated blow mold mounted on said carrier for cooperation with each of said supports, a pair of coacting rolls disposed beneath said outlet and in an overhanging position relative to said supports for imparting a preliminary configuration to the glass subsequent to its issuance from said outlet and for delivering it in a stream to said supports, said rolls each having a passageway provided therein, and means for circulating a cooling medium through said passageways.

26. Apparatus for shaping hollow glassware, comprising a rotatable carrier, a plurality of plates pivotally mounted thereon and each having an orifice provided therein, means for feeding a ribbon of glass upon said plates and over said orifices, a blowhead mounted on said carrier for cooperation with each of said plates, an arm pivotally mounted on said carrier beneath each of said plates, a spindle rotatably mounted in said arm, a blow mold carried by said spindle, and means disposed in the path of movement of said molds for rotating said spindle and blow mold under the influence of the movement of said carrier.

27. Apparatus for shaping hollow glassware, comprising a rotatable carrier, a plurality of plates pivotally mounted thereon and each having an orifice provided therein, means for feeding a ribbon of glass upon said plates and over said orifices, a blow head mounted on said carrier for cooperation with each of said plates, an arm pivotally mounted on said carrier beneath each of said plates, a spindle rotatably mounted in said arm, a blow mold carried by said spindle for cooperation with said plates, a pulley fixed to said spindle, and a flexible cable disposed in the path of movement of said pulleys and adapted to be frictionally engaged thereby during the application of blowing pressure by said blow head.

28. Apparatus for shaping hollow glassware comprising a carrier mounted for rotation around a vertical axis, a plurality of parison supports carried thereby and each having an orifice provided therein, means for feeding a ribbon of glass upon said supports and in a position extending over a plurality of said orifices, a blowhead associated with each of said supports for applying blowing pressure to the glass supported thereby, a sectional blow mold mounted for movement into and out of cooperative relation with each of said supports, means for rotating said blow molds about their axes, and means for opening and closing the sections of said blow molds in a predetermined angular position relative to the axis of rotation of said carrier.

29. Apparatus for shaping hollow glassware comprising a carrier mounted for rotation around a vertical axis, a plurality of parison supports carried thereby and each having an orifice provided therein, means for feeding a ribbon of glass upon said supports and over said orifices, a blowhead associated with each of said supports for applying blowing pressure to the glass supported thereby, an arm pivotally mounted on said carrier beneath each of said supports, a spindle rotatably mounted in said arm, a sectional blow mold having the sections thereof pivotally mounted on said spindle, a plurality of lugs operatively connected to the sections of said blow mold, a member carried by said arm and having recesses formed therein for engagement by said lugs, means for elevating said arm to raise said blow mold into cooperative position relative to said support, means for closing the sections of said mold about a parison suspended from said support, and means for yieldably opening the sections of said mold when the lugs carried thereby are in registry with the recesses in said member.

30. Apparatus for shaping hollow glassware comprising a carrier mounted for rotation about a vertical axis, a plurality of plates mounted on said carrier and each having an orifice provided therein, means for feeding a ribbon of glass upon said plates and over said orifices, a blowhead associated with each of said plates for blowing the glass downwardly through the orifices of said plates, and a burner disposed below the path of movement of the glass suspended below said orifices, for applying heat and gaseous pressure to said glass to reheat the chilled skin thereof and to control the configuration imparted thereto by said blowing pressure.

31. Apparatus for shaping hollow glassware comprising a carrier mounted for rotation about a vertical axis, a plurality of plates mounted on said carrier and each having an orifice provided therein, means for feeding a ribbon of glass upon said plates and over said orifices, a blowhead associated with each of said plates for blowing the glass downwardly through said orifices, a plurality of burners, disposed below the path of movement of the glass suspended below said orifices, for applying heat and gaseous pressure to said glass to reheat the chilled skin thereof and to control the configuration imparted thereto by said blowing pressure, and means for independently regulating the heat and gaseous pressure applied to the glass by each of said burners.

32. Apparatus for shaping hollow glassware comprising a rotatable carrier, a plurality of plates mounted thereon and each having an orifice provided therein, means for feeding a ribbon of glass upon said plates and over said orifices, a blowhead mounted on said carrier for cooperation with each of said plates, an arm pivotally mounted on said carrier beneath each of said plates, a spindle rotatably mounted in said arm, a sectional blow mold having the sections thereof pivotally mounted on said spindle for vertical swinging movement, a rod extending through said spindle and pivotally connected to each of said sections, a flexible ribbon cam for actuating said rod to open and close the sections of said blow mold, and means for flexing said cam to adjust the time of occurrence and rate of movement of the opening and closing movements of the sections of said blow mold.

33. Apparatus for shaping hollow glassware comprising a rotatable carrier, a plurality of plates mounted on said carrier and each having an orifice provided therein, a blowhead mounted on said carrier for cooperation with each of said plates, a fluid pressure cylinder communicating with said blowhead, a piston mounted in said cylinder, a flexible cam for actuating said piston to deliver a predetermined volume of air to said blowhead, and means for flexing said cam to regulate the time of occurrence and rate of movement of said piston.

34. Apparatus for shaping hollow glassware comprising a rotatable carrier, a plurality of plates mounted on said carrier and each having an orifice provided therein, means for feeding a ribbon of glass upon said plates and over said orifices, a blowhead mounted on said carrier for cooperation with each of said plates, a fluid pressure cylinder communicating with said blowhead, a piston mounted in said cylinder, a cam for moving said piston inwardly to deliver a predetermined volume of air through said blowhead, a spring for returning said piston to its outer position subsequent to the delivery of said air to said blowhead, and means for varying the contour of said cam to regulate the time of occurrence and rate of inward movement of said piston.

35. Apparatus for shaping hollow glassware comprising a rotatable carrier, a plurality of plates mounted on said carrier and each having an orifice provided therein, a blowhead mounted on said carrier for cooperation with each of said plates, a fluid pressure cylinder communicating with said blowhead, a piston mounted in said cylinder, means for actuating said piston to deliver a predetermined volume of air through said blowhead, a source of finish-blowing air communicating with said cylinder, a valve for interrupting communication between said source of blowing air and said cylinder, and means for opening said valve by a continued inward movement of said cylinder, after the delivery of the initial increment of air to said blowhead, for establishing communication between said source of blowing air and said blowhead.

36. Apparatus for shaping hollow glassware comprising a carrier mounted for rotation about a vertical axis, a plurality of parison supports mounted on said carrier and each having an orifice provided therein, means for imparting a predetermined configuration to a stream of glass and depositing it upon said supports and in a position extending over a plurality of said orifices, a blow head mounted on said carrier for cooperation with each of said supports, means for lowering and raising said blowheads into and out of operative position relative to said supports, and means for adjustably limiting the downward movement of said blowheads.

37. Apparatus for shaping hollow glassware comprising a carrier mounted for rotation about a vertical axis, a plurality of parison supports mounted on said carrier and each having an orifice provided therein, means for forming a ribbon of glass having a series of relatively thick portions connected by relatively thin portions and depositing it upon said supports with the thick portions thereof disposed over said orifices, a blowhead and an associated blow mold mounted on said carrier for cooperation with each of said supports, means for lowering and raising each blow mold into and out of operative position relative to its support, and means for adjustably limiting the upward movement of said blow mold.

38. Apparatus for shaping hollow glassware comprising a carrier mounted for rotation about a vertical axis, a plurality of plates mounted on said carrier and each having an orifice provided therein, means for forming a ribbon of glass of predetermined width and thickness and depositing it upon said plates in a position extending over a plurality of said orifices, a blowhead mounted on said carrier for movement into and out of operative position relative to each of said plates, an arm pivotally mounted on said carrier beneath each of said plates, a mold holder mounted on said arm and a sectional blow mold mounted on said holder, and having the sections thereof detachably secured thereto.

39. Apparatus for shaping hollow glassware comprising a carrier mounted for rotation about a vertical axis, a plurality of plates mounted on said carrier and each having an orifice provided therein, a blowhead mounted on said carrier for movement into and out of operative position relative to each of said plates, an arm pivotally mounted on said carrier beneath each of said plates, a mold holder mounted on said arm, a sectional blow mold mounted on said holder, and a clip for detachably maintaining each of said sections in operative position on said holder.

40. Apparatus for making blown glassware, comprising a continuously moving carrier for receiving a strip or ribbon of molten glass, said carrier having a plurality of downwardly opening orifices for the issue of glass from said strip, means for moving said carrier in a horizontal plane, a plurality of blow molds mounted for movement in the same horizontal plane with each other for the greater part of their cycle of movement, and each adapted to close beneath one of said orifices for enclosing glass issuing from said orifice, and means for blowing air through said orifice into the interior of the glass when the glass is enclosed in said mold.

41. Apparatus for shaping hollow glassware, comprising a movable carrier, a plurality of supports mounted on said carrier and each having an orifice provided therein, means for feeding a ribbon of glass upon said supports and in a position covering a plurality of said orifices, and a blow mold mounted on said carrier for cooperation with each of said supports.

42. Apparatus for shaping hollow glassware, comprising a movable carrier, a plurality of plates pivotally mounted on said carrier and each having an orifice provided therein, means for feeding a ribbon of glass upon said plates and in a position extending over a plurality of said orifices, and a blowhead and an associated blow mold mounted on said carrier for cooperation with each of said supports.

43. Apparatus for shaping hollow glassware, comprising a carrier mounted for movement in a horizontal plane, a plurality of plates pivotally mounted thereon and each having an orifice provided therein, means for feeding a ribbon of glass upon said plates and over said orifices, a blowhead mounted for movement above said carrier for cooperation with each of said plates, a supporting member mounted for movement below said carrier and beneath each of said plates, a spindle rotatably carried by said supporting member, a blow mold carried by said spindle, and means disposed in the path of movement of said mold for rotating said spindle and blow mold under the influence of the movement of said supporting member.

44. Apparatus for shaping hollow glassware, comprising a rotatable carrier, a plurality of plates pivotally mounted thereon and each having an orifice provided therein, means for feeding a ribbon of glass upon said plates and over said orifices, a blowhead mounted on said carrier for cooperation with each of said plates, an arm mounted on said carrier below each of said plates, a spindle rotatably mounted in said arm, a blow mold carried by said spindle, and means disposed in the path of movement of said molds for rotating said spindle and blow mold under the influence of the movement of said carrier.

45. Apparatus for shaping hollow glassware, comprising a rotatable carrier, a plurality of plates pivotally mounted thereon and each having an orifice provided therein, means for feeding a ribbon of glass upon said plates and over said orifices, a blowhead mounted on said carrier for cooperation with each of said plates, means for variably determining the lowermost position of said blowheads, an arm mounted on said carrier below each of said plates, means for variably determining the uppermost position of said arms, a spindle rotatably mounted in said arm, a blow mold carried by said spindle, and means disposed in the path of movement of said molds for rotating said spindle and blow mold under the influence of the movement of said carrier.

46. Apparatus for making blown glassware, comprising a carrier for receiving a strip or ribbon of molten glass, said carrier having a plurality of downwardly opening orifices for the issue of glass from said strip, means for moving said carrier in a horizontal plane, a plurality of blow molds mounted for movement in the same horizontal plane with each other for the greater part of their cycle of movement and each adapted to close beneath one of said orifices for enclosing glass issuing from said orifice, means for blowing air through said orifice into the interior of the glass when the glass is enclosed in said mold, and means for opening and closing said molds in a direction transversely of the direction of movement of said molds.

47. Apparatus for shaping hollow glassware, comprising a plurality of parison supports, a supporting member for each parison support positioned under said support, a spindle rotatably mounted in said supporting member, a sectional blow mold having the sections thereof pivotally mounted on said spindle, a plurality of lugs operatively connected with the sections of said blow mold, a second member carried by first named member and having recesses formed therein for engagement by said lugs, means for elevating said first named member to raise said blow mold into cooperative position relative to said support, means for closing the sections of said mold about a parison suspended from said support, and means for yieldably opening the sections of said mold when the lugs carried thereby are in registry with the recesses in said last named member.

48. Apparatus for shaping hollow glassware, comprising a movable carrier, a plurality of parison supports mounted on said carrier and each having an orifice provided therein, means for feeding a stream of glass upon said supports and in a position extending over a plurality of said orifices, and an independent blowhead and associated blow mold for each of said supports.

49. Apparatus for shaping hollow glassware, comprising a movable carrier, a plurality of parison supports mounted on said carrier and each having an orifice provided therein, means for feeding a stream of glass upon said supports and in a position extending over a plurality of said orifices, an independent blowhead and associated blow mold for each of said supports, and means for independently supplying pressure fluid to each of said blow heads.

50. Apparatus for shaping hollow glassware, comprising a movable carrier, a plurality of parison supports mounted on said carrier and each having an orifice provided therein, means for feeding a stream of glass upon said supports and in a position extending over a plurality of said orifices, and means for independently supplying pressure fluid to each of said orifices.

51. Apparatus for shaping hollow glassware, comprising a movable carrier, a plurality of brackets detachably mounted on said carrier, a parison support pivotally mounted on each of said brackets and each having an orifice provided therein, means for feeding a stream of glass upon said supports and in a position extending over a plurality of said orifices, and a blowhead and an associated blow mold pivotally mounted on each of said brackets for cooperation with the support carried thereby and forming therewith an independent and quickly detachable glass fabricating unit, and means for independently supplying blowing air to each of said blow heads.

52. Apparatus for shaping hollow glassware, comprising a movable carrier, a plurality of plates mounted on said carrier and each having an orifice and a passageway for a cooling medium, means for feeding a ribbon of glass upon said plates and over said orifices, a blowhead and an associated blow mold mounted for cooperation with each of said plates, and means for circulating a cooling medium through the passageways in said plates.

53. Apparatus for shaping hollow glassware, comprising a movable carrier, a plurality of plates mounted on said carrier and each having an orifice provided therein, means for feeding a ribbon of glass upon said plates and over said orifices, a blowhead and an associated blow mold mounted for cooperation with each of said plates, each of said blowheads having a passageway provided therein, and means for circulating a cooling medium through the passageways in said blowheads.

54. Apparatus for shaping hollow glassware, comprising a movable carrier, a plurality of supports mounted on said carrier and each having an orifice provided therein, means for feeding a ribbon of glass upon said plates and over said orifices, means associated with each of said supports for blowing the glass downwardly through the orifices of said supports, and a burner disposed below the path of movement of the glass suspended below said orifices, for applying heat and gaseous pressure to said glass to reheat the chilled skin thereof and to control the configuration imparted thereto by said blowing pressure.

55. Apparatus for shaping hollow glassware comprising a movable carrier, a plurality of plates mounted thereon and each having an orifice provided therein, means for feeding a ribbon of glass upon said plates and over said orifices, a blowhead mounted on said carrier for cooperation with each of said plates, an arm pivotally mounted on said carrier beneath each of said plates, a spindle rotatably mounted in said arm, a sectional blow mold having the sections thereof pivotally mounted on said spindle for vertical swinging movement, a rod extending through said spindle and pivotally connected to each of said sections, a flexible ribbon cam for actuating said rod to open and close the sections of said blow mold, and means for flexing said cam to adjust the time of occurrence and rate of movement of the opening and closing movements of the sections of said blow mold.

56. Apparatus for making blown glassware, comprising a continuously movable support, means for feeding molten glass onto said support, said support having a plurality of orifices for the downward delivery of portions of said glass, a plurality of blow molds mounted for movement with said support, and each adapted to close beneath one of said orifices, and means for directing fluid under pressure through said orifices into said glass while the glass is enclosed in the said molds and attached to said support.

57. Apparatus for making blown glassware, comprising a continuously rotatable support, means for feeding molten glass onto said support, said support having a plurality of orifices for the downward delivery of portions of said glass, a plurality of blow molds rotatable with said support, and each adapted to close about the glass beneath one of said orifices, and means for directing fluid under pressure through said orifices into said glass while the glass is enclosed in the said molds and attached to said support.

58. Apparatus for shaping hollow glassware comprising a support for the glass that is to be fabricated and a blow head for supplying pressure fluid to such glass, a fluid pressure cylinder communicating with said blow head, a piston mounted in said cylinder, a flexible cam for actuating said piston to deliver a predetermined volume of air to said blow head, and means for flexing said cam to regulate the time of occurrence and rate of movement of said piston.

59. Apparatus for shaping hollow glassware comprising a support for the glass that is to be fabricated, a blow head for supplying air to said glass, a fluid pressure cylinder communicating with said blow head, a piston mounted in said cylinder, a cam for moving said piston inwardly to deliver a predetermined volume of air through said blow head, a spring for returning said piston to its initial position subsequent of the delivery to said air to said blow head and cylinder for filling the cylinder, and means for varying the contour of said cam to regulate the time of occurrence and rate of inward movement of said piston.

60. Apparatus for shaping hollow glassware comprising a support for the glass that is to be fabricated, a blow head for supplying pressure fluid to said glass, a fluid pressure cylinder communicating with said blow head, a piston mounted in said cylinder, means for actuating said piston to deliver a predetermined volume of air through said blow head, a source of finish blowing air communicating with said cylinder, a valve for interrupting said communication between said source of finish blowing air and said cylinder, and means for opening said valve after the delivery of said predetermined volume of air to said blow head and establishing communication between said source of finish blowing air and said blow head.

61. Apparatus for making hollow glassware comprising a parison support, a blow head cooperable therewith, a piston and cylinder for supplying puff blowing air to said head, automatic means to move said piston and cylinder relatively to one another to force puff blowing air through said head to a parison held in said support, and means for varying the relative movement of said cylinder and said piston.

Signed at Hartford, Conn., this 12th day of March, 1927.

ROBERT W. CANFIELD.